United States Patent [19]

Terada et al.

[11] Patent Number: 5,180,629
[45] Date of Patent: Jan. 19, 1993

[54] INJECTION-MOLDED ARTICLE

[75] Inventors: Masahiro Terada; Nobuji Sugimoto; Toshiro Watanabe, all of Kanagawa; Takashi Sugimoto, Mie, all of Japan

[73] Assignees: Nissan Motor Co., Ltd., Yokohama; Mitsubishi Petrochemical Co., Ltd., Tokyo, both of Japan

[21] Appl. No.: 722,417

[22] Filed: Jun. 27, 1991

[30] Foreign Application Priority Data

Jun. 27, 1990 [JP] Japan ................... 2-166870

[51] Int. Cl.⁵ .................. C08L 23/10; C08L 23/16; C08L 53/00
[52] U.S. Cl. .................... 428/220; 525/240; 525/211; 525/88; 293/102
[58] Field of Search ............... 525/240, 88; 428/220

[56] References Cited

U.S. PATENT DOCUMENTS

| | | | |
|---|---|---|---|
| 4,417,019 | 11/1983 | Yamamoto et al. | 524/522 |
| 4,480,065 | 10/1984 | Kawai et al. | 525/88 |
| 4,621,114 | 11/1986 | Watanabe | 525/88 |
| 4,705,818 | 10/1987 | Kawai et al. | 525/88 |
| 4,748,206 | 5/1988 | Noguoa et al. | 525/240 |
| 5,045,589 | 9/1991 | Ueno | 525/88 |

FOREIGN PATENT DOCUMENTS

| | | |
|---|---|---|
| 2821342 | 11/1978 | Fed. Rep. of Germany . |
| 52-23148 | 2/1977 | Japan . |
| 52-126450 | 10/1977 | Japan . |
| 53-145857 | 12/1978 | Japan . |
| 54-16559 | 2/1979 | Japan . |
| 56-106948 | 8/1981 | Japan . |
| 57-135847 | 8/1982 | Japan . |
| 57-159842 | 10/1982 | Japan . |
| 61-21145 | 1/1986 | Japan . |
| 63-57655 | 3/1988 | Japan . |
| 63-146951 | 6/1988 | Japan . |
| 2161490 | 6/1984 | United Kingdom . |

*Primary Examiner*—Carman J. Seccuro, Jr.
*Attorney, Agent, or Firm*—Pennie & Edmonds

[57] ABSTRACT

A large-sized exterior part of an automotive vehicle, injection-molded and formed of a polymer material comprises: (A) polypropylene in an amount ranging from 50 to 70 by weight %, the polypropylene containing ethylene in an amount not more than 15 weight % relative to the polypropylene and having a MFR (at 230° C.) ranging from 5 to 60 g/10 min.; (B) ethylene-propylene copolymer rubber polymerized in the presence of a vanadium-based catalyst, in an amount ranging from 5 to 30 weight %, the copolymer containing propylene in an amount ranging from 20 to 40 weight % relative to the ethylene-propylene copolymer rubber and having a Mooney viscosity $ML_{1+4}(100°$ C.) ranging from 20 to 80; (C) ethylene-propylene copolymer rubber polymerized in the presence of a titanium-based catalyst, in an amount ranging from 5 to 45 weight %, the copolymer containing propylene in an amount ranging from 30 to 70 weight % relative to the ethylene-propylene copolymer rubber and having a Mooney viscosity $ML_{1+4}(100°$ C.) ranging from 20 to 75; and (D) polyethylene in an amount not more than 10 weight %, the polyethylene having a MFR (at 190° C.) ranging from 5 to 50 g/10 min. The injection-molded article has an average thickness ranging from 2 to 6 mm, a flexural elastic modulus ranging from 3000 to 6000 kg/cm², and a coefficient of linear expansion not higher than $8 \times 10^{-5}/°C$.

14 Claims, 1 Drawing Sheet

INJECTION-MOLDED ARTICLE

BACKGROUND OF THE INVENTION

1. Field of the Invention

This invention relates to an injection-molded article which is improved in external appearances upon being molded and upon being painted while maintaining a good balance between low temperature impact resistance and flexibility, and more particularly to a polymer material suitable for a large-sized exterior part of an automotive vehicle.

2. Description of the Prior Art

In recent years, a tendency of making automotive parts of plastic is rapidly progressing in order to lighten the weight of an automotive vehicle for the purpose of improving fuel economy. In this regard, a variety of plastics have been used as the material of automotive parts such as a bumper, a facia, a door garnish and parts of a vehicle body which are conventionally formed of metal, in addition to an instrumental panel, a console box, a glove box, a steering wheel, interior parts such as a trim member, a molding protector, a lamp housing, a front grille, a mud guard and a corner bumper.

Examples of plastic as the material of the above automotive parts are RIM (Reaction injection Molded) polyurethane, composite polypropylene, and a so-called polymer alloy made of polycarbonate/ABS or polyphenylether/polyamide.

Concerning the material or plastic to be used for a bumper or a facia, it is classified to two types. One of them is a plastic having such a characteristic as to mainly absorb impact of a vehicle collision upon being deformed and thereafter recover the original shape. The other is a plastic which is lower in deformation recovery characteristics but higher in rigidity than the above plastic, while being light in weight and inexpensive.

Examples of the former plastic are RIM polyurethane, polypropylene or ethylene-propylene copolymer rubber which is blended with partially cross-linked ethylene-propylene copolymer rubber, polypropylene blended with oil. These generally exhibit a flexural elastic modulus of about 2000 to 5000 kg/cm$^2$. Examples of the latter plastic are ethylene-propylene copolymer rubber and polypropylene blended with inorganic filler. These exhibit a flexural elastic modulus of about 8000 to 12000 kg/cm$^2$. The above-mentioned plastics except for RIM polyurethane have been extensively used because of their capability of being fabricated by injection molding at a high productivity and at a low production cost.

As discussed above, a low rigidity type bumper has been usually formed of the material (plastic) such as polypropylene blended with a partially cross-linked ethylene-propylene copolymer rubber or polypropylene blended with oil, of the above-listed materials. These are produced by methods disclosed, for example, in Japanese Patent Provisional Publication Nos. 53-145857, 54-16554 and 57-135847. Another material (plastic) for a low rigidity type bumper is polypropylene-based composition blended with a noncross-linked ethylene-propylene copolymer rubber and a high density polyethylene. This plastic is produced by a method disclosed, for example, in Japanese Patent Provisional Publication No. 56-106948. A further material (plastic) for the same type bumper is a polypropylene composition blended with a noncross-linked ethylene-propylene copolymer rubber and oil. This material is produced by a method disclosed, for example, in Japanese Patent Provisional Publication No. 63-146951. A high rigidity type bumper has been usually formed, for example, of polypropylene composition blended with a noncross-linked ethylene-propylene copolymer rubber which is produced by a method disclosed, for example, in Japanese Patent Provisional Publication Nos. 52-23148 and 52-126450.

However, difficulties have been encountered in the above-discussed materials (plastics) particularly in cases where the materials are used for a large-sized injection-molded article such as an automotive bumper which is so shaped as to correspond to a vehicle body in order that the surface thereof is aligned with that of the vehicle body. In other words, the large-sized article such as the bumper formed of the above-discussed materials exhibits a coefficient of linear expansion of about 10 to $17 \times 10^{-5}/°C$. which is considerably high as compared with that of steel sheet of the automotive body. Accordingly, the dimension of the bumper changes with ambient temperature change (from $-40°$ to $80°$ C.), so that the surface alignment characteristics of the bumper with the automotive body does not occur. As a result, the above-discussed plastics cannot be used as the material for the bumper requiring the surface alignment characteristics with the automotive body. In view of this, it is now common that such an automotive part is formed of an expensive polyurethane-based material containing fibrous filler having a low coefficient of linear expansion.

In addition, the above-discussed materials for the low rigidity type bumper, produced by the methods disclosed in the above Japanese Patent Publications require a complicated compounding process and/or oil extending operation in their production, so that there is a tendency for the flow of the material to be irregular. As a result, the thus produced materials for the low rigidity type bumper necessarily cannot provide an injection-molded article which is good in external appearance and low temperature impact resistance.

The above-discussed materials for the high rigidity type bumper, produced by the methods disclosed in the above Japanese Patent Publications have a good balance among heat resistance, moldability and the like but is high in rigidity which has inferior in impact energy absorbing characteristics during a vehicle collision and in deformation recovery characteristics after the vehicle collision. Additionally, these materials are high in coefficient of linear expansion similarly to the above materials for the high rigidity type bumper, and accordingly not satisfactory in surface alignment of the bumper with the automotive body.

As a measure of producing a material (plastic) having a low coefficient of linear expansion, it is common to fill sheet-shaped or fibrous filler into the above-discussed materials or compositions. Glass fiber, talc, whisker and/or the like is used as the filler as disclosed, for example, in Japanese Patent Provisional Publication Nos. 61-21145 and 63-57653. It is to be noted that a large amount of filler is required to be filled in the material in order to obtain a sufficiently low coefficient of linear expansion. However, filling such a large amount of filler unavoidably lowers the flowability of the material and degrades the external appearance of a molded article in connection with weld marks and that of a painted article in connection with the gloss and brightness character, while providing an insufficient low temperature impact resistance.

SUMMARY OF THE INVENTION

In order to solve the above-problems encountered in the conventional techniques, the inventors of the present invention have made a variety of researches and developments in the field of materials in connection with those in the conventional techniques. As a result, the inventors have reached the principle of the present invention upon finding that significant advantages and unexpected results have been exhibited from an injection-molded article which is produced by using a particular low rigidity type olefin-based material in the following manner: Two kinds of particular ethylene-propylene copolymer rubbers are blended to a particular polypropylene so as to obtain a particular elastic modulus of a resultant injection-molded article, and additionally the article is so injection-molded as to have a particular thickness thereby to render a coefficient of linear expansion not higher than $8 \times 10^{-5}/°C$. The thus produced article has been found remarkably low in thermal deformation and therefore is suitable for a large-sized automotive part such as a bumper which requires a surface alignment with an automotive vehicle body. Additionally, the thus produced article has been found greatly improved in external appearance upon being injection-molded and upon being painted, while exhibiting a good balance between a low temperature impact resistance and a flexibility.

It is an object of the present invention to provide an improved injection-molded article which overcomes the drawbacks encountered in conventional corresponding articles.

Another object of the present invention is to provide an improved injection-molded article formed of a material which provides a good external appearance of a molded article in connection with flow and weld marks and a good external appearance of a painted article in connection with a gloss and brightness character, maintaining a good balance between a low temperature impact resistance and a flexibility.

A further object of the present invention is to provide an improved material suitable for a injection-molded automotive large-sized part which particularly requires a surface alignment with an automotive body.

An injection-molded article of the present invention is formed of a material comprising: (A) polypropylene in an amount ranging from 50 to 70 weight %, the polypropylene containing ethylene in an amount not more than 15 weight % relative to the polypropylene and having a MFR (at 230° C.) ranging from 5 to 60 g/10 min.; (B) ethylene-propylene copolymer rubber polymerized in the presence of a vanadium-based catalyst, in an amount ranging from 5 to 30 weight %, the copolymer containing propylene in an amount ranging from 20 to 40 weight % relative to the ethylene-propylene copolymer rubber and having a Mooney viscosity $ML_{1+4}(100°$ C.) ranging from 20 to 80; (C) ethylene-propylene copolymer rubber polymerized in the presence of a titanium-based catalyst, in an amount ranging from 5 to 45 weight %, the copolymer containing propylene in an amount ranging from 30 to 70 weight % relative to the ethylene-propylene copolymer rubber and having a Mooney viscosity $ML_{1+4}(100°$ C.) ranging from 20 to 75; and (D) polyethylene in an amount not more than 10 weight %, the polyethylene having a MFR (at 190° C.) ranging from 5 to 50 g/10 min., wherein the injection-molded article has an average thickness ranging from 2 to 6 mm, a flexural elastic modulus ranging from 3000 to 6000 kg/cm², and a coefficient of linear expansion not higher than $8 \times 10^{-5}/°C$.

DETAILED DESCRIPTION OF THE INVENTION

[I] Invention

Figure 1:
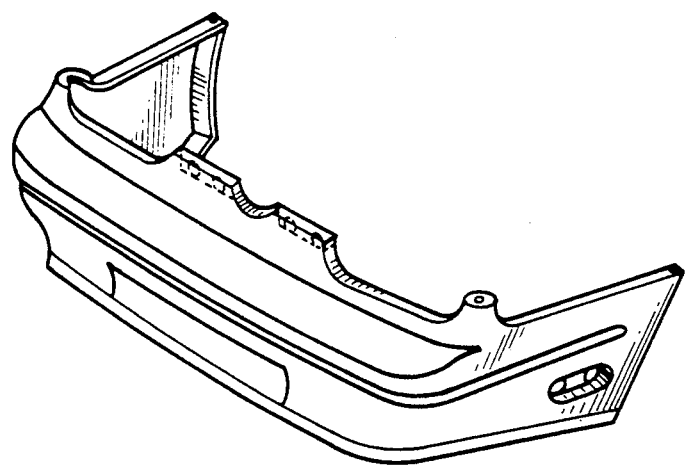
FIG. 1 is a perspective view of an injection-molded bumper-shaped article in connection with Examples and Comparative Examples.

According to the present invention, an injection-molded article is formed of a material comprising:
(A) polypropylene in an amount ranging from 50 to 70 weight %, the polypropylene containing ethylene in an amount not more than 15 weight % relative to the polypropylene and having a MFR (at 230° C.) ranging from 5 to 60 g/10 min.;
(B) ethylene-propylene copolymer rubber polymerized in presence of a vanadium-based catalyst, in an amount ranging from 5 to 30 weight %, the copolymer containing propylene in an amount ranging from 20 to 40 weight % relative to the ethylene-propylene copolymer rubber and having a Mooney viscosity $ML_{1+4}(100°$ C.) ranging from 20 to 80;
(C) ethylene-propylene copolymer rubber polymerized in presence of a titanium-based catalyst, in an amount ranging from 5 to 45 weight %, the copolymer containing propylene in an amount ranging from 30 to 70 weight % relative to said ethylene-propylene copolymer rubber and having a Mooney viscosity $ML_{1+4}(100°$ C.) ranging from 20 to 75; and
(D) polyethylene in an amount not more than 10 weight %, the polyethylene having a MFR (at 190° C.) ranging from 5 to 50 g/10 min.,
wherein the injection-molded article has an average thickness ranging from 2 to 6 mm, a flexural elastic modulus ranging from 3000 to 6000 kg/cm², and a coefficient of linear expansion not higher than $8 \times 10^{-5}/°C$.

[II] Composition

<Component A>

The propylene as a component (A) of the material of the injection-molded article is crystalline and has an ethylene content ranging from 0 to 15 weight %, preferably 2 to 10 weight % of the propylene. The propylene has a MFT (Melt Flow Rate) ranging from 5 to 60 g/10 min. The MFT is measured according to JIS (Japanese Industrial Standard)-K 7210 in which the MFT is a flow rate (g/10 min.) of a resin or the propylene (kept at 230° C.) flowing through a hole (diameter: 2.0955 mm, axial length: 8 mm) formed in a die under a load of 2.16 kg.

If the propylene having a MFT lower than the range from 5 to 60 g/10 min. is used as the component (A), the injection-moldability of the article is degraded so that a resultant injection-molded article is degraded in external appearance such that production of flow mark is apparent. If the propylene having a MFT higher than the same range is used, the resultant injection-molded article is degraded in low temperature impact resistance.

Additionally, if the ethylene content of the propylene as the component (A) exceeds the range of 0 to 15 weight %, not only problems arise in injection-moldability (particularly in mold releasability) but also deformation of the resultant injection-molded article tends to occur in a high temperature condition.

The blended proportion of the polypropylene as the component (A) is within the range from 50 to 70 weight %, preferably 55 to 65 weight % relative to the whole material. If the blended proportion is lower than the above range, the resultant injection-molded article is degraded in external appearance (for example, forming flow marks) and degraded in mold releasability during molding. If the blended proportion exceeds the above range, the resultant injection-molded article is enlarged or degraded in coefficient of linear expansion and degraded in low temperature impact resistance.

<Component B>

The ethylene-propylene copolymer rubber as a component (B) of the material of the injection-molded article is produced by using a vanadium-based catalyst including a vanadium compound and an organic aluminum compound. The ethylene-propylene copolymer rubber has a Mooney viscosity $ML_{1+4}(100°\ C.)$ ranging from 20 to 80, preferably 30 to 50, and has a propylene content ranging from 20 to 40 weight %, preferably 22 to 30 weight %. Here, meant by the "ethylene-propylene copolymer" is not only mere ethylene-propylene copolymer but also a copolymer of the ethylene-propylene and other comonomer(s) such as nonconjugated diene. Such copolymer may be ethylene-propylene terpolymers with small amounts of a nonconjugated diene. Examples of the nonconjugated diene are dicyclopentadiene, 1,4-hexadiene, cyclooctadiene, methylnorbornene and 5-ethylidene-2-norbornene.

The copolymer rubber produced in the presence of the above vanadium-based catalyst is essential for providing a low temperature impact resistance, flexibility and a low coefficient of linear expansion to the resultant injection-molded article.

If the copolymer rubber to be used as the component (B) has a Mooney viscosity lower than the range of 20 to 80, the resultant injection-molded article is degraded in moldability, particularly mold releasability, and degraded in low temperature impact resistance. If the copolymer rubber has a Mooney viscosity exceeding the range, the resultant injection-molded article is degraded in moldability, particularly in external appearance of the molded article (for example, forming flow mark) while raising the coefficient of linear expansion thereof.

If the copolymer rubber to be used as the component (B) has a propylene content lower than the above range of 20 to 40 weight %, the flexibility of the resultant injection-molded article is problematic. If the copolymer rubber has a propylene content exceeding the range, the low temperature impact resistance and the coefficient of linear expansion of the same are problematic.

The blended proportion of the component (B) is within the range of 5 to 30 weight %, preferably 10 to 25 weight %. If the proportion is lower than this range, the resultant injection-molded article will not only result high in coefficient of linear expansion but also result in degraded low temperature impact resistance. If the proportion exceeds the above range, the external appearance is degraded so as to particularly form flow and weld marks, while being degraded in mold releasability during injection-molding.

<Component C>

The ethylene-propylene copolymer rubber as a component (C) of the material of the injection-molded article is produced by using or in the presence of the titanium-based catalyst including a titanium compound and an organic aluminum compound. The copolymer has the Mooney viscosity $ML_{1+4}(100°\ C.)$ ranging from 20 to 75, preferably 30 to 50, and has the propylene content ranging from 30 to 70 weight %, preferably 40 to 60 weight %. Here, meant by the "ethylene-propylene copolymer" is not only mere ethylene-propylene but also a copolymer of ethylene-propylene copolymer and other comonomer(s) such a nonconjugated diene, similarly to the above-discussed component (B).

The copolymer rubber produced in the presence of the above titanium-based catalyst is essential in obtaining an improved external appearance (particularly in connection with weld marks) and a flexibility of the resultant injection-molded article.

If the copolymer rubber to be used as the component (C) has a propylene content lower than the above range of 30 to 70 weight %, the external appearance of the resultant injection-molded article becomes problematic. If the copolymer rubber has a propylene content exceeding the above range, the resultant injection-molded article is problematic in low temperature impact resistance, flexibility and coefficient of linear expansion.

If the copolymer rubber to be used as the component (C) has a Mooney viscosity lower than the range of 20 to 75, the article is degraded in moldability (particularly mold releasability) and in low temperature impact resistance. If the copolymer rubber has a Mooney viscosity exceeding the above range, the article is degraded in moldability so as to degrade the external appearance of the resultant molded article (for example, forming flow marks) while being raised in coefficient of linear expansion.

The blended proportion of the copolymer rubber as the component (C) is within the range of 5 to 45 weight %, preferably 10 to 35 weight % relative to the whole material. If this proportion is lower than the above range, the resultant injection-molded article not only becomes high in coefficient of linear expansion but also degrades in low temperature impact resistance and in external appearance so that a formation of weld marks is apparent. Such a weld mark formation is not only at a time immediately after the injection-molding but also during a pretreatment (rinsing for degreasing with trichloroethane or the like) before a painting process. It is to be noted that the injection-molded article according to the present invention unexpectedly maintains a good condition even after the pretreatment of the painting. If the blended proportion of the copolymer rubber as the component (C) exceeds the above range, the resultant injection-molded article is degraded in external appearance so as to form flow marks while being degraded in mold releasability during injection molding.

<Component D>

The polyethylene as the component (D) of the material is produced by a usual method and has the MFR ranging from 5 to 50 g/10 min., preferably 10 to 30 g/10 min. Examples of the polyethylene are low density polyethylene produced by a high pressure method; polyethylenes produced by a low pressure method; and low, medium and high density polyethylenes which are copolymers of ethylene produced by a medium or low pressure method and straight chain α-olefine. Of these, the polyethylenes produced by the low pressure method is particularly preferable. Examples of α-olefine are butene-1, pentene-1, hexene-1 and octene-1.

If the polyethylene to be used as the component (D) has a MFR lower than the above range, the resultant injection-molded article is degraded in external appearance so that, for example, flow marks are formed. If the polyethylene has a MFR exceeding the above range, the resultant injection-molded article is degraded in impact resistance.

The blended proportion of the polyethylene as the component (D) is within the range of 0 to 10 weight %, preferably 3 to 7 weight %. If the proportion exceeds this range, the moldability (particularly mold releasabilty) of the article is degraded while lowering the low temperature impact resistance of the resultant injection-molded article. This proportion particularly improves the moldability and the low temperature impact resistance.

<Other components>

The material of the injection-molded article of the present invention may contain other components as far as the object of the present invention cannot be missed. In other words, the material may contain a variety of additives such as a pigment, a stabilizer, an antioxidant, a ultraviolet absorbent and a foaming agent, in addition to the above-discussed components (A), (B), (C) and (D). Additionally, the material may contain a mineral softening agent such as a process oil or an extender oil usually used as a rubber softening agent, an inorganic filler and the like, as far as the effect of the present invention cannot be largely degraded.

[III] Injection-molded article

The injection-molded article formed of the material having the above-discussed composition is used, for example, as a large-sized exterior part of an automotive vehicle, and therefore is required to have a predetermined flexural elastic modulus (measured accoring to JIS-K 7203). In other words, it is preferable that the blended proportions of the respective components (A), (B), (C) and (D) are selected from the above respective ranges so as to obtain the flexural elastic modulus ranging from 3000 to 6000 kg/cm$^2$, preferably 4000 to 5000 kg/cm$^2$.

In case that the injection-molded article is the large-sized automotive exterior part, if the flexural elastic modulus of the material is lower than the above range, the molded exterior part is so flexible that problems arise during taking-out thereof from the mold, during painting thereof and during intallation thereof to a vehicle body. If the flexural elastic modulus exceeds the above range, the exterior part is so hard as to degrade performances such as impact absorption, deformation recovery, damaging the vehicle body when a vehicle collision occurs.

Additionally, it is important for the injection-molded article of the present invention to have a coefficient of linear expansion not higher than $8 \times 10^{-5}/°C$, particularly in the direction of flow of a resin or the material during injection molding of the article. If the coefficient of linear expansion exceeds the value of $8 \times 10^{-5}/°C$, the dimensional change of the article (large-sized automotive exterior part) is large within a temperature range of $-40°$ to $80° C.$ in which the exterior part is practically used, so that the exterior part installed to the vehicle body unavoidably deforms or waves.

Furthermore, it is important for the injection-molded article to have an average thickness ranging from 2 to 6 mm, preferably 2.5 to 5 mm. Meant by the "average thickness" is an average thickness of the injection-molded article in an area of 70% or more of the total area of the article. If the thickness of the injection-molded article exceeds this range, the coefficient of linear expansion of the article unavoidably increases while enlarging the weight of the article thereby degrading the installation operation efficiency and the weight balance of the vehicle body. The article having such an increased thickness is undesirable also from the economical veiw point. If the thickness of the injection-molded article is less than the above range, the article is unavoidably degraded in installation operation efficiency and shape-maintaining ability, particularly in case the length of the article exceeds 1 meter.

The above-discussed four components (A), (B), (C) and (D) and the optional components, used if necessary, are well blended by using a usual kneading machine such as a Banbury mixer, a kneader, a monoaxial extruder and a biaxial extruder. The thus blended components are used as the material of the injection-molded article, and supplied to a usual injection machine to be injection-molded to a desired shape. The thus obtained injection-molded article is, for example, a large-sized automotive experior part such as a bumper, a facia, a fender air dam, an air spoiler, a molding, a front grille and a door garnish.

EXAMPLES

In order to evaluate the injection-molded article according to the present invention, Examples will be discussed hereinafter in comparison with Comparative Examples.

Evaluation of the Examples and the Comparative Examples was made on test results which were obtained by the following tests:

(1) Melt Flow Rate (MFR)

Measured according to JIS-K 7210 (temperature: 230° C. and 190° C., load: 2.16 kg).

(2) Flexural Elastic Modulus

Measured accoring to JIS-K 7203, in which a specimen (an injection-molded sheet having a 3 mm thickness) is prepared in a molding condition A shown in Table 5.

(3) Coefficient of Linear Expansion

Measured according to ASTM-D 696, in which a specimen (an injection-molded sheet having a 3 mm thickness) is prepared in the molding condition A shown in Table 5.

(4) Low Temperature Impact Resistance and Deformation Recovery Characteristics

A specimen (an injection-molded bumper-shaped large-sized article having an average thickness of 3.5 mm) as shown in FIG. 1 is prepared in a molding condition B shown in Table 5. The specimen or bumper-shaped article is supplied at its inner side with an impact absorber made of foamed polypropylene (expansion ratio: 15 times), corresponding to the practical use. The specimen is subjected to an impact test according to Federal Motor Vehicle Safety Standards (FMVSS) Part-581 (vehicle speed: 8 km or 5 mile per hour, temperature: $-30°$ C., load: 1.6 tons). After this test, the specimen was observed to be confirmed as to whether breakage and/or crack is made, upon which evaluations "G (good)" and "NG (no good)" are made if the breakage and/or crack are not made or made, respectively. These evaluations are for the low temperature impact resistance.

Furthermore, 30 minutes after the impact test, the bumper-shaped specimen is observed to confirm the amount of deformation at sections to which impact is applied. If the deformation amount is not larger than 19 mm (¾ inch) at the central part and not larger than 9.5 mm (⅜ inch) at the corner part, an evaluation is made as "G (good)". If the deformation amount exceeds the above values, an evaluation is made as "NG (no good)".

(5) Injection moldability

In the injection molding in the molding condition B, evaluation is made as "G (good)" if mold releasability is good providing no problem, whereas evaluation is made as "NG (no good)" if the molded article is left attached to a cavity side and/or the molded article cannot be smoothly taken out from a core side.

(6) External Appearance of Injection-molded Article (Flow Mark)

The bumper-shaped large-sized article prepared by injection molding in the molding condition B is evaluated under a visual observation as to whether there is a flow mark and/or uneven gloss or not. If there are no flow marks or the like, evaluation is made as "(good)". If there are flow marks or the like, evaluation is made as "NG (no good)".

(7) External Appearance of Injection-molded article (Weld Mark)

The injection-molded bumper-shaped large-sized article as same as that used in the above item (6) is evaluated by visually observing weld mark formed around an opening for a directional indicator lamp. Evaluation is made "G (good)" if the weld mark does not reach the outer surface of the bumper-shaped article, whereas evaluation is made "NG (no good)" if the weld mark reaches the outer surface.

(8) Thermal Deformation Characteristics after Installation

The injection-molded bumper-shaped large-sized article as same as that used in the above item (6) is installed at its upper 3 points and lower 3 points to a predetermined jig and subjected to a thermal cycle test including two cycles each having a part of 4 hours at −40° C. and another part of 4 hours at 90° C. After this thermal cycle test, deformation (unevenness) at the outer surface of the bumper-shaped article is evaluated under a visual observation. Evaluation is made as "G (good)" if there is no deformation, whereas evaluation is made as "NG (no good)" if there is a deformation.

(9) External Appearance of Painted Article (Gloss and Brightness Character)

The bumper-shaped large-sized article prepared by injection molding in the molding condition B is allowed to stand 30 seconds in vapor of 1,1,1-trichloroethane by using a vapor-rinsing machine. After drying, modified (for example, halogenized) polyolefine-based primer is coated on the article to form a primer film having a thickness of 5 to 10 μm. The thus coated article is then dried. Thereafter, a polyester-melamine-based paint is coated as a finish coating on the primer to have a total coated film thickness of 35 μm. The thus coated paint is set at room temperature and thereafter baked at 120° C. for 20 minutes thereby obtaining a sample for evaluation of the painted article external appearance.

The external appearance (gloss and brightnss character of the paint film) of the thus prepared sample or painted bumper-shaped article is evaluated by using a PGD (Portable Distinctness-of-Gloss) meter made by Japan Color Research Institute in Japan. It has been experimentally confirmed that the external appearance of the painted surface is better as a measured value becomes higher. In general, the painted film on a steel sheet of an automotive vehicle body is approximately within a range of 0.6 to 0.8.

EXAMPLES 1 TO 5 AND COMPARATIVE EXAMPLES 1 TO 11

The components A, B, C and D shown in Tables 1 to 4 and fibrous filler as the other component were blended in proportions shown in Table 6 by using a Henshel type mixer. The fibrous filler was glass powder (powdered glass fiber) having a diameter of 13 μm and a length of 200 μm, sold under the trade name of "Cut Fiber" and produced by Fuji Fiber Glass Co., Ltd. in Japan. The thus mixed components were molten and kneaded at 200° C. by using a 45 mm diameter biaxial extruder thereby forming pellets or a material. The pellets were injection-molded under molding conditions A and B as shown in Table 5 thereby preparing an injection-molded sheet and an injection-molded bumper-shaped large-sized article (as shown in FIG. 1) which were the specimens for evaluation. The sheet had a dimension of 120×120×3 mm for Examples 1 to 5 and Comparative Examples 1 to 9, and a dimension of 120×120×8 mm for Comparative Example 10. The injection-molded sheets and bumper-shaped large-sized articles were used as the specimens and subjected to a varity of the above discussed evaluation tests (1) to (9). The results of the evaluation tests are shown in Table 6.

As discussed above, the injection-molded article of the present invention is formed of a polyolefine-based polymer material of the low rigid type and greatly improved so as to have a coefficient of linear expansion not higher than $8 \times 10 - 5/°C$. Accordingly, even in case the polymer material is used for a large-sized automotive exterior part such as a bumper which corresponds in shape to the vehicle body and requires to have a surface alignment characteristics with the vehicle body, no problem occurs because of a less thermal deformation while having a suitable flexibility, an excellent low temperature impact resistance, and excellent external appearances of the article upon being injection-molded and upon being painted. Particularly, the bumper made of the polymer material is excellent in external appearance, in which weld mark formed near openings for lamps and for air intake are quite inconspicuous. These significant advantages can be obtained by preparing the material upon combining the polymer components A, B, C and D.

TABLE 1

| Component A (polypropylene) | MFR (g/10 min) | Ethylene content (wt %) | Polymer type |
| --- | --- | --- | --- |
| PP-1 | 25 | 0 | Homo |
| PP-2 | 35 | 6 | Block |
| PP-3 | 50 | 9 | Block |
| PP-4 | 20 | 17 | Block |
| PP-5 | 3 | 5 | Block |
| PP-6 | 80 | 5 | Block |

TABLE 2

| Component B (Ethylene propylene copolymer rubber) | $ML_{1-4}$ (100° C.) | Propylene content (wt %) | Catalyst |
|---|---|---|---|
| EPV-1 | 24 | 26 | V-based |
| EPV-2 | 70 | 27 | V-based |
| EPV-3* | 105 | 43 | V-based |
| EPV-4 | 8 | 25 | V-based |

*EPV-3 is an ethylene-propylene-ethylidene norbornene terpolymer (EPDM) and has an iodine value of 15.

TABLE 3

| Component C (Ethylene propylene copolymer rubber) | $ML_{1-4}$ (100° C.) | Propylene content (wt %) | Catalyst |
|---|---|---|---|
| EPT-1 | 42 | 42 | Ti-based |
| EPT-2 | 72 | 68 | Ti-based |
| EPT-3 | 30 | 68 | Ti-based |

TABLE 4

| Component D (polyethylene) | MFR (g/10 min) | Type |
|---|---|---|
| PE-1 | 30 | Ethylene-butene-based linear |

TABLE 4-continued

| Component D (polyethylene) | MFR (g/10 min) | Type |
|---|---|---|
|  |  | low density polyethylene |

TABLE 5

|  | Molding condition A | Molding Condition B |
|---|---|---|
|  | Injection machine | |
|  | Mold clamping force: 140 ton, Inline-screw type | Mold clamping force: 1800 ton, Inline-screw type |
|  | Shape of molded article | |
| Injection machine condition | 120 × 120 × 3 mm or 120 × 120 × 8 mm | Bumper-shape (shown in FIG. 1) having 3.5 mm thickness |
| Temp. | 220° C. | 220° C. |
| Primary pressure, time | 600 kg/cm², 5 sec. | 1,000 kg/cm², 18 sec. |
| Secondary pressure, time | 500 kg/cm², 10 sec. | 700 kg/cm², 14 sec. |
| Cooling temp. | 30° C. | 25° C. |
| Cooling time | 20 sec. | 65 sec. |
| Screw revolution speed | 80 rpm | 80 rpm |

TABLE 6

| | | | | Example | | | | | Comparative Example | | | |
|---|---|---|---|---|---|---|---|---|---|---|---|---|
| Item | | | 1 | 2 | 3 | 4 | 5 | 1 | 2 | 3 | 4 |
| Composition | | | | | | | | | | | | |
| Component A | MFR (230° C., 2.16 kg) | Ethylene content | | | | | | | | | |
| PP-1 | 25 g/10 min | 0% | | 15 | | | | | | | 10 |
| PP-2 | 35 | 6 | 60 | | 52 | 65 | 55 | | | | 50 |
| PP-3 | 50 | 9 | | 40 | | | | | | | |
| PP-4 | 20 | 17 | | | | | | 60 | | | |
| PP-5 | 3 | 5 | | | | | | | 60 | | |
| PP-6 | 80 | 5 | | | | | | | | 60 | |
| Component B | $ML_{1-4}$ (100° C.) | Propylene content | | | | | | | | | |
| EPV-1 | 24 | 26% | 10 | 25 | 15 | 28 | | 20 | | 20 | 35 |
| EPV-2 | 70 | 27 | 10 | | | | 15 | | 20 | | |
| EPV-3 | 105 | 43 | | | | | | | | | |
| EPV-4 | 8 | 25 | | | | | | | | | |
| Component C | $ML_{1-4}$ 100° C. | Propylene content | | | | | | | | | |
| EPT-1 | 42 | 42% | 20 | 15 | | 7 | 30 | 20 | 15 | 15 | |
| EPT-2 | 72 | 68 | | | 5 | | | | | | |
| EPT-3 | 30 | 68 | | | 20 | | | | | | |
| Component D | MFR (190° C., 2.16 kg) | | | | | | | | | | |
| PE-1 | 30 g/10 min | | | | 5 | 8 | | | 5 | 5 | 5 |
| Other | | | | | | | | | | | |
| Glass powder | | | | | | | | | | | |
| Evaluation | | | | | | | | | | | | |
| Flexural Elastic modulus Kg/cm² | | | 3,400 | 4,200 | 3,800 | 5,200 | 3,200 | 1,400 | 4,400 | 4,600 | 3,800 |
| Linear expansion coefficient × $10^{-5}$/°C. | | | 6.5 | 7.5 | 6.6 | 7.8 | 6.3 | 7.0 | 7.5 | 7.3 | 6.0 |
| Low temperature impact resistance | | | G | G | G | G | G | G | G | NG | G |
| Deformation recovery characteristics | | | G | G | G | G | G | G | G | G | G |
| Injection moldability | | | G | G | G | G | G | NG | G | G | G |
| External appearance (flow mark) | | | G | G | G | G | G | NG | NG | G | G |
| External appearance (weld mark) | | | G | G | G | G | G | G | G | G | NG |
| Thermal deformation characteristics | | | G | G | G | G | G | NG | G | G | G |
| External appearance (Gloss and Brightness character) | | | 0.4 | 0.4 | 0.4 | 0.4 | 0.4 | 0.3 | 0.2 | 0.4 | 0.4 |

| | | | Comparative Example | | | | | | |
|---|---|---|---|---|---|---|---|---|---|
| Item | | | 5 | 6 | 7 | 8 | 9 | 10 | 11 |
| Composition | | | | | | | | | |
| Component A | MFR (230° C., 2.16 kg) | Ethylene content | | | | | | | |
| PP-1 | 25 g/10 min | 0% | 10 | | | | | | |
| PP-2 | 35 | 6 | 50 | 60 | 80 | 20 | 65 | 60 | 60 |
| PP-3 | 50 | 9 | | | | 20 | | | |
| PP-4 | 20 | 17 | | | | | | | |
| PP-5 | 3 | 5 | | | | | | | |
| PP-6 | 80 | 5 | | | | | | | |
| Component B | $ML_{1-4}$ (100° C.) | Propylene content | | | | | | | |
| EPV-1 | 24 | 26% | 25 | | 10 | 20 | | | 10 |

TABLE 6-continued

| Component | | | | | | | | | |
|---|---|---|---|---|---|---|---|---|---|
| EPV-2 | 70 | 27 | | | | | | | 10 |
| EPV-3 | 105 | 43 | | | | 20 | | 20 | |
| EPV-4 | 8 | 25 | | | | | 20 | | |
| Component C | ML₁₊₄ 100° C. | Propylene content | | | | | | | |
| EPT-1 | 42 | 42% | | | 10 | 25 | 15 | 20 | 20 |
| EPT-2 | 72 | 68 | | | | | | | |
| EPT-3 | 30 | 68 | 40 | | | | | | |
| Component D | MFR (190° C., 2.16 kg) | | | | | | | | |
| PE-1 | 30 g/10 min | | 15 | | | | | | |
| Other | | | | | | | | | |
| Glass powder | | | | | | | 15 | | |

| Evaluation | | | | | | | |
|---|---|---|---|---|---|---|---|
| Flexural Elastic modulus Kg/cm² | 5,100 | 2,800 | 7,500 | 4,200 | 3,300 | 3,700 | |
| Linear expansion coefficient × 10⁻⁵/°C. | 9.5 | 12.5 | — | 4.0 | 10.8 | 6.0 | 14.5 |
| Low temperature impact resistance | G | NG | NG | G | G | NG | — |
| Deformation recovery characteristics | G | NG | — | G | G | NG | — |
| Injection moldability | NG | NG | — | G | G | NG | — |
| External appearance (flow mark) | G | NG | — | NG | | G | — |
| External appearance (weld mark) | NG | G | — | NG | G | NG | — |
| Thermal deformation characteristics | NG | NG | — | NG | | G | — |
| External appearance (Gloss and Brightness character) | 0.3 | — | — | 0.1 | 0.2 | 0.4 | — |

What is claimed is:

1. An injection-molded article, formed of a material comprising:
   (A) polypropylene in an amount ranging from 50 to 70 weight %, said polypropylene containing ethylene in an amount not more than 15 weight % relative to said polypropylene and having a MFR (at 230° C.) ranging from 5 to 60 g/10 min.;
   (B) ethylene-propylene copolymer rubber polymerized in the presence of a vanadium-based catalyst, in an amount ranging from 5 to 30 weight %, said copolymer containing propylene in an amount ranging from 20 to 40 weight % relative to said ethylene-propylene copolymer rubber and having a Mooney viscosity $ML_{1+4}(100°\ C.)$ ranging from 20 to 80;
   (C) ethylene-propylene copolymer rubber polymerized in the presence of a titanium-based catalyst, in an amount ranging from 5 to 45 weight %, said copolymer containing propylene in an amount ranging from 30 to 70 weight % relative to said ethylene-prolyene copolymer rubber and having a Mooney viscosity $ML_{1+4}(100°\ C.)$ ranging from 20 to 75; and
   (D) polyethylene in an amount not more than 10 weight %, said polyethylene having a MFR (at 190° C.) ranging from 5 to 50 g/10 min.,
wherein said injection-molded article has an average thickness ranging from 2 to 6 mm, a flexural elastic modulus ranging from 3000 to 6000 kg/cm², and a coefficient of linear expansion not higher than $8 \times 10^{-5}/°C$.

2. An injection-molded article as claimed in claim 1, wherein said flexural elastic modulus is set by selecting proportions of said polypropylene (A), said ethylene-propylene copolymer rubber (B), said ethylene-propylene copolymer rubber (C) and said polyethylene (D).

3. An injection-molded article as claimed in claim 1, wherein said vanadium-based catalyst includes a vanadium compound and an organic aluminum compound.

4. An injection-molded article as claimed in claim 1, wherein said titanium compound includes a titanium compound and an organic aluminum compound.

5. An injection-molded article as claimed in claim 1, wherein said polypropylene (A) is in an amount raning from 55 to 66 weight %.

6. An injection-molded article as claimed in claim 1, wherein said polypropylene (A) contains ethylene in an amount ranging from 2 to 10 weight %.

7. An injection-molded article as claimed in claim 1, wherein said ethylene-propylene copolymer rubber (B) is in an amount ranging from 10 to 25 weight %.

8. An injection-molded article as claimed in claim 1, wherein said ethylene-propylene copolymer rubber (C) is in an amount ranging from 10 to 35 weight %.

9. An injection-molded article as claimed in claim 1, wherein said ethylene-propylene copolymer rubber (C) contains propylene in an amount ranging from 40 to 60 weight %.

10. An injection-molded article as claimed in claim 1, wherein said polyethylene (D) is in an amount ranging from 3 to 7 weight %.

11. An injection-molded article as claimed in claim 1, wherein said injection-molded article has an average thickness ranging from 2.5 to 5 mm.

12. An injection-molded article as claimed in claim 1, wherein said injection-molded article has an elastic modulus ranging from 4000 to 5000 kg/cm².

13. An injection-molded large-sized exterior part of an automotive vehicle, said part being formed of a material comprising:
   (A) polypropylene in an amount ranging from 50 to 70 weight %, said polypropylene containing ethylene in an amount not more than 15 weight % relative to said polypropylene and having a MFR (at 230° C.) ranging from 5 to 60 g/10 min.;
   (B) ethylene-propylene copolymer rubber polymerized in the presence of a vanadium-based catalyst, in an amount ranging from 5 to 30 weight %, said copolymer containing propylene in an amount ranging from 20 to 40 weight % relative to said ethylene-propylene copolymer rubber and having a Mooney viscosity $ML_{1+4}(100°\ C.)$ ranging from 20 to 80;
   (C) ethylene-propylene copolymer rubber polymerized in the presence of a titanium-based catalyst, in an amount ranging from 5 to 45 weight %, said copolymer containing propylene in an amount ranging from 30 to 70 weight % relative to said ethylene-prolyene copolymer rubber and having a Mooney viscosity $ML_{1+4}(100°\ C.)$ ranging from 20 to 75; and (D) polyethylene in an amount not more than 10 weight %, said polyethylene having a MFR (at 190° C.) ranging from 5 to 50 g/10 min., wherein said injection-molded article has an average thickness ranging from 2 to 6 mm, a flexural elastic modulus ranging from 3000 to 6000 kg/cm$^2$, and a coefficient of linear expansion not higher than $8 \times 10^{-5}$/°C.

14. A bumper of an automotive vehicle, formed of a material comprising:
   (A) polypropylene in an amount ranging from 50 to 70 weight %, said polypropylene containing ethylene in an amount not more than 15 weight % relative to said polypropylene and having a MFR (at 230° C.) ranging from 5 to 60 g/10 min.;
   (B) ethylene-propylene copolymer rubber polymerized in the presence of a vanadium-based catalyst, in an amount ranging from 5 to 30 weight %, said copolymer containing propylene in an amount ranging from 20 to 40 weight % relative to said ethylene-propylene copolymer rubber and having a Mooney viscosity $ML_{1+4}(100°$ C.) ranging from 20 to 80;
   (C) ethylene-propylene copolymer rubber polymerized in the presence of a titanium-based catalyst, in an amount ranging from 5 to 45 weight %, said copolymer containing propylene in an amount ranging from 30 to 70 weight % relative to said ethylene-prolylene copolymer rubber and having a Mooney viscosity $ML_{1+4}(100°$ C.) ranging from 20 to 75; and
   (D) polyethylene in an amount not more than 10 weight %, said polyethylene having a MFR (at 190° C.) ranging from 5 to 50 g/10 min., wherein said injection-molded article has an average thickness ranging from 2 to 6 mm, a flexural elastic modulus ranging from 3000 to 6000 kg/cm$^2$, and a coefficient of linear expansion not higher than $8 \times 10^{-5}$/°C.

* * * * *